(No Model.)
E. L. WESTON.
ICE CREAM FREEZER.
No. 526,596. Patented Sept. 25, 1894.
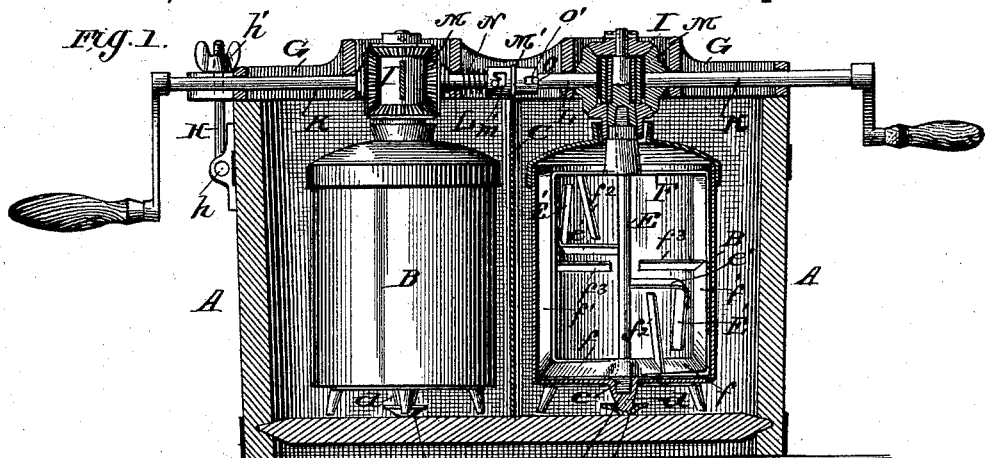
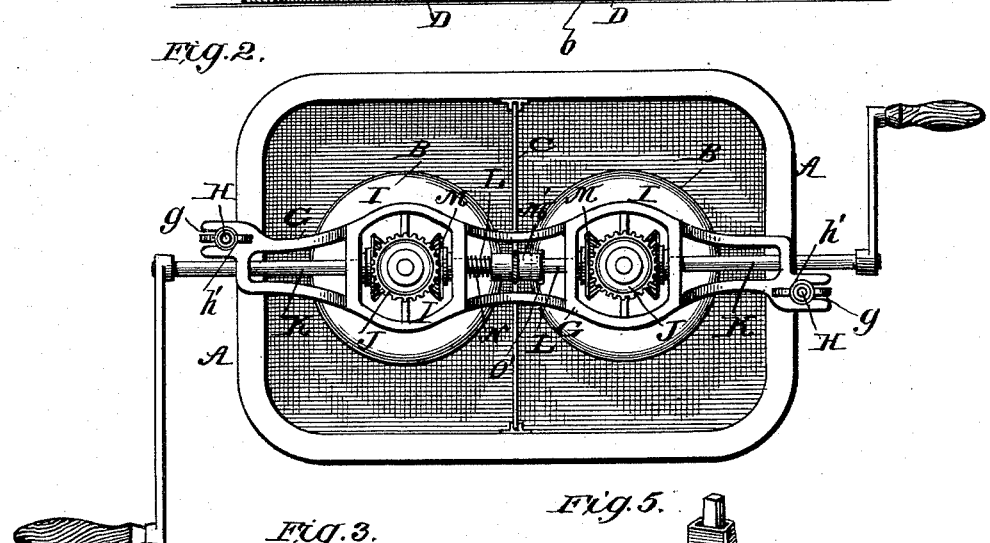
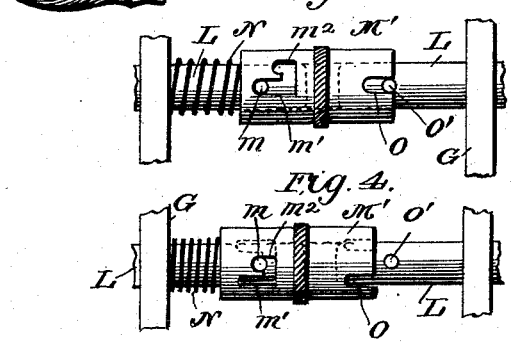
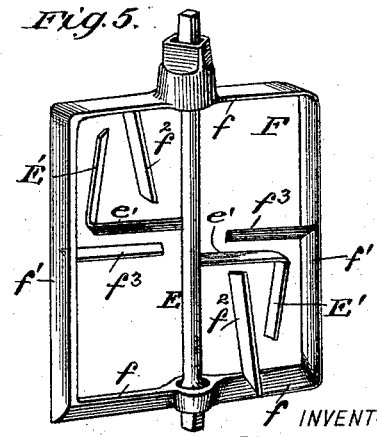
WITNESSES:
Fred G. Dieterich
P. B. Turpin
INVENTOR
Edward L. Weston
BY Munn & Co.
ATTORNEYS.

UNITED STATES PATENT OFFICE.

EDWARD L. WESTON, OF WASHINGTON, DISTRICT OF COLUMBIA.

ICE-CREAM FREEZER.

SPECIFICATION forming part of Letters Patent No. 526,596, dated September 25, 1894.

Application filed March 3, 1894. Serial No. 502,227. (No model.)

*To all whom it may concern:*

Be it known that I, EDWARD L. WESTON, of Washington city, in the District of Columbia, have invented a new and useful Improvement in Ice-Cream Freezers, of which the following is a specification.

My invention is an improvement in ice cream freezers and has for an object to provide a simple construction whereby two or more kinds of cream can be frozen at the same time or only one if desired and so that the labor in freezing one will not be greater than in an ordinary freezer and the parts not needed in freezing but one kind of cream will not be subjected to wear during such operation.

The invention also seeks to provide an improved dasher.

To these ends the invention consists in certain novel constructions and combinations of parts as will be hereinafter described and pointed out in the claims.

In the drawings—Figure 1 is a vertical longitudinal section. Fig. 2 is a top plan view of the freezer and Figs. 3, 4, and 5 are detail views.

The tub A is made sufficiently long to receive two freezing vessels or cylinders B and the necessary ice or the like surrounding them and is preferably provided centrally with a removable partition C which may be used when only one cylinder B is being used and can generally be removed when both such cylinders are in use.

In the tub are provided the seats or steps D for the bearings $d$ on the bottoms of the vessels B.

The vessels B have suitable lids and are provided in their bottoms with non-circular sockets $b$ to receive the angular end $e$ of the dasher shaft E. The dasher is composed of the shaft E and the scraper frame F. This shaft and frame are revolved in reverse direction by the gearing shown and the shaft carries with it the vessel or cylinder. I provide the shaft with a blade or blades E' which is arranged not parallel to but at an incline or angle to the axis of the shaft so that as it cuts through the cream it will tend to break the same vertically as well as radially and in practice I prefer to support this blade E' on an arm $e'$ projecting from the shaft E and to employ two of such arms and blades the arms projecting in opposite directions from the shaft and the blades in reverse directions from the arms up and down as shown.

The scraper frame F has horizontal scrapers $f$ and longitudinal scrapers $f'$ and has blades $f^2$ projected from its horizontal arms and arranged at an angle to its axis. It also has blades $f^3$ projecting inwardly from its scraper arms.

The bearing frame G extends across the tub and is suitably fastened at its ends thereto, being preferably provided at such points with notches $g$ which are entered by the swinging bolts H pivoted at $h$ to the tub and having nuts $h'$ bearing above the ends of the frame so that the latter may be clamped firmly to the tub as desired. This frame G is provided with bearing supports I I for two independent sets J J of drive gearing such gearing being arranged to drive the dashers of their respective cylinders as shown and between these two sets of gearing which are operated by the handle shafts K K, I provide the shafts L L journaled in the frame G and each geared by its gear wheel M with its respective drive gearing so that either of said shafts may be driven independently of the other when they are detached or uncoupled and it will also be seen that when these shafts L are coupled both sets of drive gearing may be operated by turning either one of the handle shafts and by preference I make one of the crank handles long and the other short so that when but slight power and speed is desired one handle may be used and the other be used when the turning is harder.

The shafts L L are in alignment and a detachable coupling is provided by which they may be rigidly coupled to turn together or may be freed to turn independently so that when only one cylinder is being used the shafts may be entirely uncoupled so that the shaft L leading to the drive gearing not used will be free of wear and strain. This coupling is preferably a sleeve M' supported on one shaft L actuated by a spring N and movable into and out of engagement with the other shaft being provided in its end with a notch or notches O to engage projections O' on the shaft.

The coupling sleeve M' is held to the shaft which supports it by projections $m$ which enter slots $m'$ formed longitudinally in the sleeve and having transverse wings $m^2$ in which the projections may fit when the sleeve is in uncoupled position as shown. When so adjusted the sleeve will be held uncoupled and may be conveniently adjusted by the hand to such position or into coupled position as desired. See Figs. 3 and 4. To facilitate the adjustment the sleeve may be formed with a circumferential rib.

The slot $m'$ with its wing $m^2$ forms an approximately L-shaped slot in which the projections of its supporting shaft play. As in practice the dashers will be turned in opposite directions it will be understood they should be manufactured in rights and lefts.

Having thus described my invention, what I claim as new, and desire to secure by Letters Patent, is—

1. In an ice cream freezer, the combination of the independent freezers, the handle shafts, gearing whereby either handle shaft may operate its respective freezer, shaft sections arranged between said freezers, gearing between each of said sections and its respective freezer, and a detachable coupling between said shaft sections all substantially as described whereby either handle shaft may be caused to operate its separate freezer or to operate both freezers substantially as and for the purposes set forth.

2. In an ice cream freezer the combination of the supporting frame two independent shafts arranged in alignment a spring actuated coupling section supported and movable longitudinally on one of the shafts and provided with approximately L-shaped slots, the shaft to which it is secured being provided with projections entering said slots, the outer end of the coupling being movable into and out of engagement with the other shaft substantially as and for the purposes set forth.

3. The combination in an ice cream freezer of the shaft frame, the handle shafts journaled therein, the shaft sections arranged between the inner ends of the handle shafts and geared at their outer ends with their respective handle shafts and a detachable coupling by which said shaft sections may be locked together at their adjacent ends or freed to move independently substantially as and for the purposes set forth.

4. The improved dasher for ice cream freezers composed of the scraper frame the blade projecting from one of the horizontal arms of said frame and arranged at an angle to the axis of the frame, the shaft centrally within and turning independently of said frame an arm projected from said shaft and a blade projected from said arm and arranged to extend alongside the projecting blade of the scraper frame all substantially as and for the purposes set forth.

5. In an ice cream freezer a dasher shaft provided with opposite outwardly projecting arms and blades projecting from said arms each in the direction of the end of the shaft nearest its supporting arm and arranged in the direction of their length at an angle to the shaft substantially as set forth.

EDWARD L. WESTON.

Witnesses:
SOLON C. KEMON,
FRED G. DIETERICH.